United States Patent
Catherwood et al.

(10) Patent No.: US 10,248,521 B2
(45) Date of Patent: Apr. 2, 2019

(54) RUN TIME ECC ERROR INJECTION SCHEME FOR HARDWARE VALIDATION

(71) Applicant: Microchip Technology Incorporated, Chandler, AZ (US)

(72) Inventors: Michael Catherwood, Georgetown, TX (US); Brant Ivey, Chandler, AZ (US); Sankar Rangarajan, Phoenix, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 168 days.

(21) Appl. No.: 15/089,352

(22) Filed: Apr. 1, 2016

(65) Prior Publication Data

US 2016/0292059 A1    Oct. 6, 2016

Related U.S. Application Data

(60) Provisional application No. 62/142,019, filed on Apr. 2, 2015.

(51) Int. Cl.
*G06F 11/00* (2006.01)
*G06F 11/263* (2006.01)
*G06F 11/10* (2006.01)
*G06F 11/22* (2006.01)

(52) U.S. Cl.
CPC ............ *G06F 11/263* (2013.01); *G06F 11/10* (2013.01); *G06F 11/2205* (2013.01); *G06F 11/2215* (2013.01)

(58) Field of Classification Search
CPC .................................................. G06F 11/22
USPC ........................................................ 714/41
See application file for complete search history.

(56) References Cited

U.S. PATENT DOCUMENTS

| | | | |
|---|---|---|---|
| 8,707,104 B1* | 4/2014 | Jean ................ | G06F 11/1048 714/41 |
| 2009/0249148 A1 | 10/2009 | Ito et al. ................ | 714/746 |
| 2012/0266033 A1* | 10/2012 | Gold ................ | G06F 11/1052 714/718 |
| 2015/0212923 A1* | 7/2015 | Sugiyama ........ | G06F 11/3644 714/38.1 |
| 2015/0293827 A1* | 10/2015 | Han ................ | G06F 11/2215 714/41 |

FOREIGN PATENT DOCUMENTS

EP    2677429 A1    12/2013    .............. G06F 11/10

OTHER PUBLICATIONS

"Section 52. Flash Memory with Support for Live Update," Microchip Technology Incorporated, 32 pages, © 2013.
International Search Report and Written Opinion, Application No. PCT/US2016/025799, 10 pages, dated Jul. 4, 2016.

* cited by examiner

*Primary Examiner* — Sarai E Butler
(74) *Attorney, Agent, or Firm* — Slayden Grubert Beard PLLC

(57) ABSTRACT

Systems and methods for a run-time error correction code ("ECC") error injection scheme for hardware validation are disclosed. The systems and methods include configuring a read path to internally forward read data, and injecting at least one faulty bit into the forwarded read data via a read fault injection logic. The systems and methods may also include configuring a write path to internally forward write data, and injecting at least one faulty bit into the forwarded write data via a write fault injection logic.

18 Claims, 5 Drawing Sheets

| Register Names | | | Bit Names | | | | | | | |
|---|---|---|---|---|---|---|---|---|---|---|
| 32-Bit (31:0) | 16-Bit (15:0) | 8-Bit (7:0) | Bit 31/23/15/7 | Bit 30/22/14/6 | Bit 29/21/13/5 | Bit 28/20/12/4 | Bit 27/19/11/3 | Bit 26/18/10/2 | Bit 25/17/9/1 | Bit 24/16/8/0 |
| ECCCON | ECCCONH | ECCCON_D | | | | | | | | |
| | | ECCCON_C | | | | FLT2PTR[7:0] | | | | |
| | ECCCONL | ECCCON_B | | | | FLT1PTR[7:0] | | | | |
| | | ECCCON_A | | | | | | | | FLTINJ |
| ECCADDR | ECCADDRH | ECCADDR_D | | | | ECCADDR[31:24] | | | | |
| | | ECCADDR_C | | | | ECCADDR[24:16] | | | | |
| | ECCADDRL | ECCADDR_B | | | | ECCADDR[15:8] | | | | |
| | | ECCADDR_A | | | | ECCADDR[7:0] | | | | |
| ECCSTAT | ECCSTATH | ECCSTAT_D | | | | | | | DEDOUT | DEDIN |
| | | ECCSTAT_C | | | | SYND[7:0] | | | | |
| | ECCSTATL | ECCSTAT_B | | | | SECOUT[7:0] | | | | |
| | | ECCSTAT_A | | | | SECIN[7:0] | | | | |

RUN TIME ECC ERROR INJECTION SCHEME FOR HARDWARE VALIDATION

CROSS-REFERENCE TO RELATED APPLICATIONS

This application claims priority to commonly owned U.S. Provisional Patent Application No. 62/142,019, filed Apr. 2, 2015, which is hereby incorporated by reference herein for all purposes.

TECHNICAL FIELD

The present disclosure relates to peripheral devices in microcontrollers, in particular to a run-time ECC error injection scheme for hardware validation.

BACKGROUND

Some microcontroller devices incorporate Error Correcting Code ("ECC") features, which detect and correct errors resulting in extended Flash memory life. ECC may be implemented in 128-bit wide Flash words or four 32-bit instruction word groups. As a result, when programming Flash memory on a device where ECC is employed, the programming operation may be at minimum four instructions words or in groups of four instruction words.

There is a need for runtime checking & fault injection of safety critical systems to provide for functional safety. Requirements for handling two simultaneous faults at some safety levels adds need to occasionally test fault logic itself with fault injection.

SUMMARY

Systems and methods for a run-time error correction code ("ECC") error injection scheme for hardware validation are disclosed. The systems and methods include configuring a read path to internally forward read data, and injecting at least one faulty bit into the forwarded read data via a read fault injection logic. The systems and methods may also include configuring a write path to internally forward write data, and injecting at least one faulty bit into the forwarded write data via a write fault injection logic.

According to various embodiments, an integrated peripheral device having a runtime self-test capabilities may include: a read path configured to internally forward read data; and a read fault injection logic configured to, under program control, inject at least one faulty bit into the forwarded read data. In other embodiments, the integrated peripheral device may also include: a write path configured to internally forward write data; and a write fault injection logic configured to, under program control, inject at least one faulty bit into the forwarded write data.

In some embodiments, the peripheral device is an Error Correction Code module in a microcontroller. In some configurations, the at least one faulty bit comprises a faulty parity bit.

In some embodiments, the read fault injection logic is further configured to inject the at least one faulty bit into the forwarded read data when the user has enabled the injection and when the read address matches a user-specified memory location. Alternatively, or in conjunction, the write fault injection logic is further configured to inject the at least one faulty bit into the forwarded write data when the user has enabled the injection and when the write address matches a user-specified memory location.

In some embodiments, the peripheral device may include error detection logic configured to, under program control, notify an ECC system that an error is present based at least on the at least one faulty bit in the forwarded read data.

According to various embodiments, an integrated peripheral device having a runtime self-test capabilities is disclosed. The integrated peripheral device may include a write path configured to internally forward write data; and a write fault injection logic configured to, under program control, inject at least one faulty bit into the forwarded write data.

According to various embodiments, a method for implementing a run-time ECC error injection scheme for hardware validation is disclosed. The method may include: configuring a read path to internally forward read data; and injecting at least one faulty bit into the forwarded read data via a read fault injection logic. In the same or alternative embodiments, the method may also include configuring a write path to internally forward write data; and injecting at least one faulty bit into the forwarded write data via a write fault injection logic.

BRIEF DESCRIPTION OF THE DRAWINGS

FIG. 5 illustrates an example register summary of an ECC fault injection system, in accordance with certain embodiments of the present disclosure.

DETAILED DESCRIPTION

Some existing microcontroller devices incorporate Error Correcting Code ("ECC") features, which detect and correct errors resulting in extended Flash memory life. ECC may be implemented in 128-bit wide Flash words or four 32-bit instruction word groups. As a result, when programming Flash memory on a device where ECC is employed, the programming operation may be at minimum four instructions words or in groups of four instruction words. This is the reason that the Quad Word programming command exists and why row programming always programs multiples of four words. For a given software application, ECC can be enabled at all times, disabled at all times, or dynamically enabled using a dedicated control register. When ECC is enabled at all times, a dedicated Single Word programming command does not function, and the quad word is the smallest unit of memory that can be programmed. When ECC is disabled or enabled dynamically, both the Word and Quad word programming NVMOP commands are functional and the programming method used determines how ECC is handled. In the case of dynamic ECC, if the memory was programmed with the Word command, ECC is turned off for that word, and when it is read, no error correction is performed. If the memory was programmed with the Quad Word or Row Programming commands, ECC data is written and tested for errors (and corrected if needed) when read. More information about ECC and Flash programming can be retrieved from the respective reference manuals, for example the "PIC 32 Reference Manual" available from Applicant, in particular reference manual "Section 52. Flash Memory with Support for Live Update", which is hereby incorporated by reference.

There is a need for runtime checking and fault injection of safety critical systems to provide for functional safety. Requirements for handling two simultaneous faults at some safety levels adds need to occasionally test fault logic itself with fault injection. For example, if a communications module has a built-in cyclic redundancy check ("CRC"), but a user or programmer of the communications modules doesn't have access to the CRC result value and any data used to generate the CRC result value, the user or programmer may be unable and/or unwilling to use the CRC feature.

According to various embodiments, a fault injection scheme can be provided for an ECC module to intentionally inject errors into the data, allowing for safely testing that the ECC module is working. Additionally, according to various embodiments, the production test interface to an ECC module is simplified by allowing for a fast and comprehensive functional test of the ECC module. Further, the functional testing may be relatively faster and more comprehensive by bypassing the flash memory and testing any combination of input data and parity.

Figure 1:
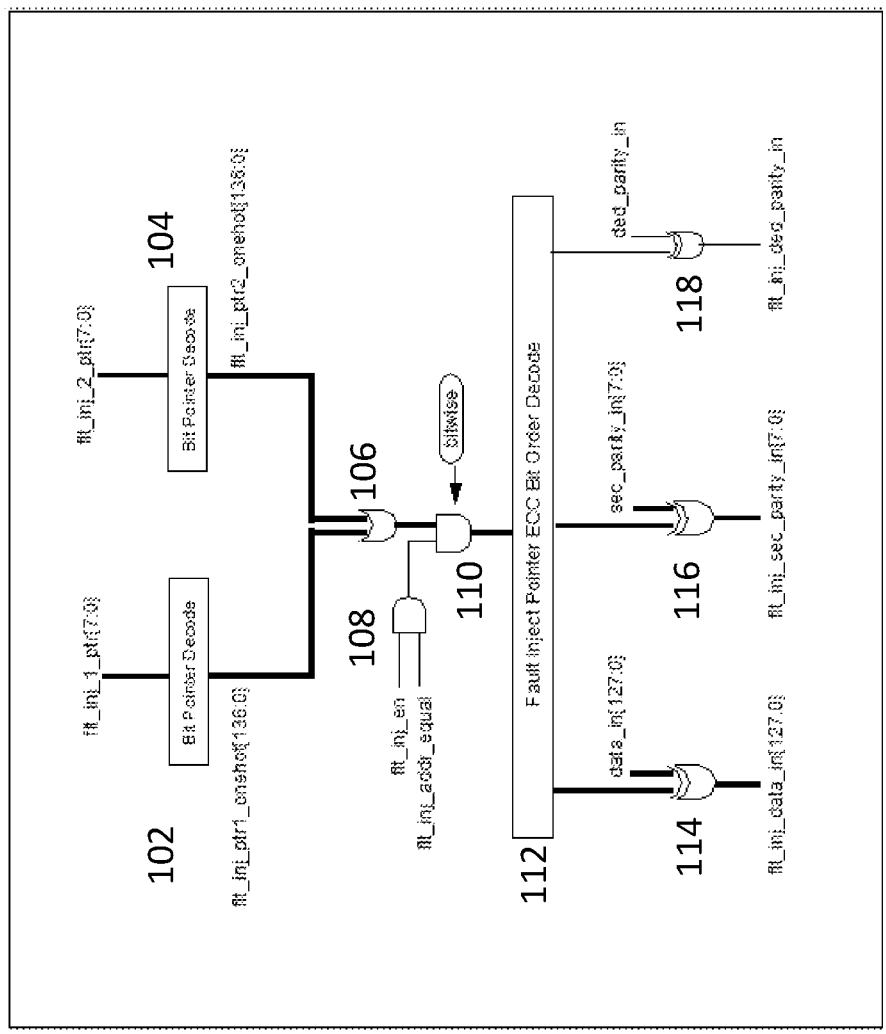
FIG. 1 illustrates an example ECC read path fault injection logic block diagram for injecting a single- or double-bit fault into a read path of an ECC module for hardware validation, in accordance with certain embodiments of the present disclosure.

FIG. 1 illustrates an example ECC read path fault injection logic block diagram 100 for injecting a single- or double-bit fault into a read path of an ECC module for hardware validation, in accordance with certain embodiments of the present disclosure. In some embodiments, example logic block diagram 100 may include a plurality of bit pointer decoders 102, 104, OR gate 106, AND gates 108, 110, bit order decoder 112, and XOR gates 114, 116, 118.

In some embodiments, example logic block diagram 100 may include a plurality of bit pointer decoders 102, 104. In the illustrative example of FIG. 1, two bit pointer decoders 102, 104 are illustrated, although more, fewer, and/or different decoders may be used without departing from the scope of the present disclosure. In some embodiments, decoders 102, 104 may be any appropriate electronic components, including logic components, software modules including program instructions stored on nonvolatile memory and executable by a processor, etc. operable to decode a bit pointer string. For example, decoders 102, 104 may decode an eight-bit pointer string into a one-hot signal in order to select a specific bit in up to 136-bits of data. Other decoder configurations may be included in any given configuration without departing from the scope of the present disclosure.

In some embodiments, each decoder 102, 104 may be operable to receive a fault injection pointer string. For example, decoder 102 may be operable to receive a first fault injection pointer string (e.g., "flt_inj_1_ptr[7:0]") and decoder 104 may be operable to receive a second fault injection pointer string (e.g., "flt_inj_2_ptr[7:0]"). Further, each decoder 102, 104 may be operable to communicate a decoded pointer string (e.g., a one-hot signal selecting a specific bit in a data set; for example, a 136-bit data set). For example, decoder 102 may be operable to communicate a first decoded fault injection pointer string (e.g., "flt_inj_ptr1_onehot[136:0]") and decoder 104 may be operable to communicate a second decoded fault injection pointer string (e.g., "flt_inj_ptr2_onehot[136:0]").

In some embodiments, the plurality of decoded fault injection pointer strings may be communicated to OR gate 106. OR gate 106 may be any appropriate electronic component and/or collection of components operable to perform a logical OR operation on a plurality of incoming signals. In some embodiments, OR gate 106 may be operable to perform an OR operation on the plurality of decoded fault injection pointer strings.

In some embodiments, example logic block diagram 100 may also include AND gate 108. In some embodiments, AND gate 108 may be any appropriate electronic component and/or collection of components operable to perform a logical AND operation on a plurality of incoming signals. In the illustrative example, AND gate 108 is operable to perform an AND operation on two incoming signals: a fault injection enable signal (e.g., "flt_inj_en") and an address match indication signal (e.g., "flt_inj_addr_equal"). In some embodiments, the signals incident to AND gate 108 are associated with conditions that a user and/or programmer of an ECC module may wish to impose prior to injecting an error into the ECC system. For example, the ECC module may be set up to only inject an error when: (1) the user of the ECC module has actively enabled the fault injection (e.g., set the fault injection enable signal); and (2) the read address matches a user-specified memory location (e.g., the address match indication signal is logically appropriate to the match). This may ensure that fault injection only occurs at a point selected by a user, allowing the resulting error interrupt to be handled appropriately.

In some embodiments, example logic block diagram 100 may also include AND gate 110. In some embodiments, AND gate 110 may be any appropriate electronic component and/or collection of components operable to perform a bitwise logical AND operation on a plurality of incoming signals. In the illustrative example, AND gate 110 is operable to perform a bitwise AND operation on two incoming signals: the communicated output of AND gate 108 and the communicated output of OR gate 106. This bitwise output may then be communicated to decoder 112.

In some embodiments, decoder 112 may be any appropriate electronic components, including logic components, software modules including program instructions stored on nonvolatile memory and executable by a processor, etc. operable to decode the output of AND gate 110 in order to provide a fault injection pointer ECC bit order to a plurality of outputs.

In the illustrative example, decoder 112 provides outputs to three additional logical components, although more, fewer, and/or different components may be used without departing form the scope of the present disclosure. In the illustrated configuration, the output of decoder 112 is communicated to XOR gates 114, 116, 118.

In some embodiments, XOR gate 114 may be any appropriate electronic component and/or collection of components operable to perform a logical XOR operation on a plurality of incoming signals. In the illustrative example, XOR gate 114 is operable to perform an XOR operation on two incoming signals: the communicated output of decoder 112 and a corresponding data bit (e.g., "data_in[127:0]"). The associated output (e.g., "flt_inj_data_in[127:0]") may then be communicated to an ECC module as described in more detail below with reference to FIG. 2. In some embodiments, the output of XOR gate 114 may be associated with a fault that has been injected into a data bit that is part of the data set to be test.

In some embodiments, XOR gate 116 be any appropriate electronic component and/or collection of components operable to perform a logical XOR operation on a plurality of incoming signals. In the illustrative example, XOR gate 116 is operable to perform an XOR operation on two incoming signals: the communicated output of decoder 112 and a corresponding parity bit (e.g., "sec_parity_in[7:0]"). The associated output (e.g., "flt_inj_sec_parity_in[7:0]") may then be communicated to an ECC module as described in more detail below with reference to FIG. 2. In some embodiments, the output of XOR gate 116 may be associated with a fault that has been injected into a parity bit that is associated with the data set to be test.

In some embodiments, XOR gate 118 be any appropriate electronic component and/or collection of components operable to perform a logical XOR operation on a plurality of incoming signals. In the illustrative example, XOR gate 118 is operable to perform an XOR operation on two incoming signals: the communicated output of decoder 112 and a corresponding parity bit (e.g., "ded_parity in[7:0]"). The associated output (e.g., "flt_inj_ded_parity_in[7:0]") may then be communicated to an ECC module as described in more detail below with reference to FIG. 2. In some embodiments, the output of XOR gate 118 may be associated with a fault that has been injected into a parity bit that is associated with the data set to be test.

Although certain logic modules and configurations have been illustrated to aid in disclosure, more, fewer, and/or different configurations may be available without departing from the scope of the present disclosure.

Figure 2:
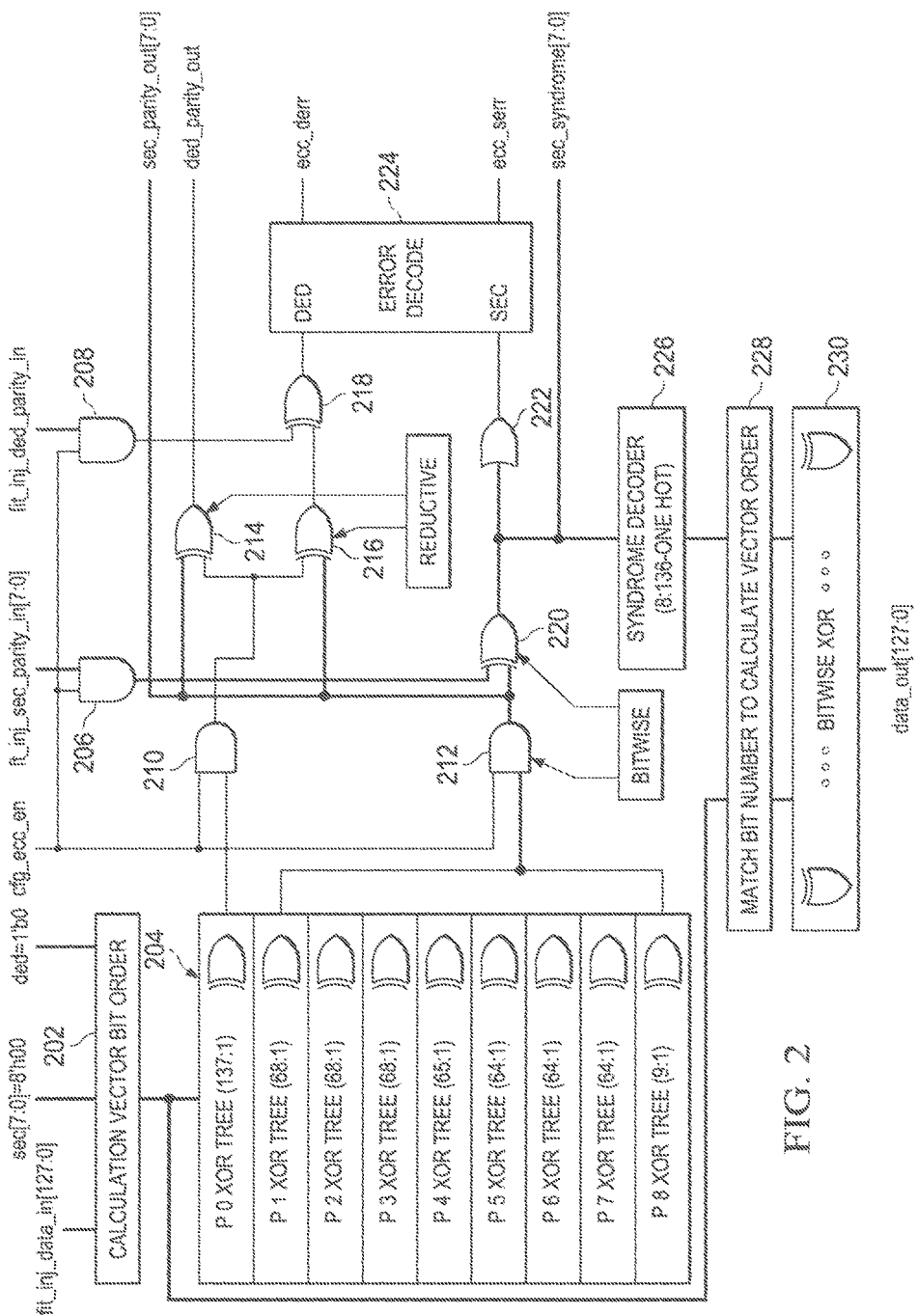
FIG. 2 illustrates an example ECC module block diagram for a run-time ECC error injection scheme for a read path, in accordance with certain embodiments of the present disclosure.

FIG. 2 illustrates an example ECC module block diagram 200 for a run-time ECC error injection scheme for a read path, in accordance with certain embodiments of the present disclosure. In some embodiments, example block diagram 200 may include calculation vector bit order 202, XOR tree 204, AND gates 206, 208, 210, 212, XOR gates 214, 216, 218, 220, OR gate 222, error decoder 224, syndrome decoder 226, bit match 228, and bitwise XOR array 230.

In some embodiments, calculation vector bit order 202 may be any appropriate electronic component and/or collection of components operable to order the calculation vector bits incoming to the ECC module. For example, calculation vector bit order 202 may receive one or more inputs from the example logic block diagram 100. These inputs may include, for example, the fault injection data output (e.g., flt_inj_data_in[127:0]). Calculation vector bit order 202 may also receive a plurality of other inputs, including for example a plurality of parity bit inputs (e.g., sec[7:0], ded). The output of calculation vector bit order 202 may then be communication to XOR tree 204 and/or bit match 228.

In some embodiments, XOR tree 204 may include a plurality of XOR trees, each associated with a portion of the data set. In the illustrative example, XOR tree 204 includes nine sub-trees. Each sub-tree may include a plurality of XOR gates, which may be any appropriate electronic component and/or collection of components operable to perform a logical XOR operation on a plurality of incoming signals. The inputs to XOR tree 204 may include the output of calculation vector bit order 202.

In some embodiments, example block diagram 200 may also include AND gate 206. AND gate 206 may be any appropriate electronic component and/or collection of components operable to perform a logical AND operation on a plurality of incoming signals. In the illustrative example, AND gate 206 performs a logical AND operation on one of the outputs of example logic block diagram 100 (e.g., flt_inj_sec_parity_in[7:0]) as well as an ECC enable signal (e.g., "cfg_ecc_en"). This may allow for the introduction of a parity fault signal into the ECC logic when appropriately enabled.

In some embodiments, example block diagram 200 may also include AND gate 208. AND gate 208 may be any appropriate electronic component and/or collection of components operable to perform a logical AND operation on a plurality of incoming signals. In the illustrative example, AND gate 208 performs a logical AND operation on one of the outputs of example logic block diagram 100 (e.g., flt_inj_ded_parity_in) as well as an ECC enable signal (e.g., "cfg_ecc_en"). This may allow for the introduction of a parity fault signal into the ECC logic when appropriately enabled.

In some embodiments, example block diagram 200 may also include AND gate 210. AND gate 210 may be any appropriate electronic component and/or collection of components operable to perform a logical AND operation on a plurality of incoming signals. In the illustrative example, AND gate 210 performs a logical AND operation on one of the outputs of XOR tree 204 as well as an ECC enable signal (e.g., "cfg_ecc_en"). This may allow for the introduction of a data fault signal into the ECC logic when appropriately enabled.

In some embodiments, example block diagram 200 may also include AND gate 212. AND gate 212 may be any appropriate electronic component and/or collection of components operable to perform a bitwise logical AND operation on a plurality of incoming signals. In the illustrative example, AND gate 212 performs a bitwise logical AND operation on a plurality of the outputs of XOR tree 204 as well as an ECC enable signal (e.g., "cfg_ecc_en"). This may allow for the bitwise introduction of a data fault into the ECC logic when appropriately enabled.

In some embodiments, example block diagram 200 may also include XOR gate 214. XOR gate 214 may be any appropriate electronic component and/or collection of components operable to perform a logical XOR operation on a plurality of incoming signals. In the illustrative example, XOR gate 214 performs a logical XOR operation on one of the outputs of AND gate 212 as well as an output of AND gate 210. This may allow for the output of a parity signal into the ECC logic. XOR gate 214 may provide a reductive function to the incoming signals.

In some embodiments, example block diagram 200 may also include XOR gate 216. XOR gate 216 may be any appropriate electronic component and/or collection of components operable to perform a logical XOR operation on a plurality of incoming signals. In the illustrative example, XOR gate 216 performs a logical XOR operation on one of the outputs of AND gate 206 as well as an output of AND gate 210. This may allow for the output of a parity signal into further ECC logic such as error decoder 224. XOR gate 214 may provide a reductive function to the incoming signals.

In some embodiments, example block diagram 200 may also include XOR gate 218. XOR gate 218 may be any appropriate electronic component and/or collection of components operable to perform a logical XOR operation on a plurality of incoming signals. In the illustrative example, XOR gate 218 performs a logical XOR operation on one of the outputs of AND gate 208 as well as an output of XOR gate 216. This may allow for the output of a parity signal into the ECC logic such as error decoder 224.

In some embodiments, example block diagram 200 may also include XOR gate 220. XOR gate 220 may be any appropriate electronic component and/or collection of components operable to perform a bitwise logical XOR operation on a plurality of incoming signals. In the illustrative example, XOR gate 220 performs a bitwise logical XOR operation on one of the outputs of AND gate 206 as well as an output of AND gate 212. This may allow for the output of a parity signal into the ECC logic such as error decoder 224.

In some embodiments, example block diagram 200 may also include OR gate 222. OR gate 222 may be any appropriate electronic component and/or collection of components operable to perform a logical OR operation on a plurality of incoming signals. In the illustrative example, OR gate 222 performs a logical OR operation on one of the bitwise outputs of XOR gate 220. This may allow for the output of a parity signal into the ECC logic such as error decoder 224.

In some embodiments, example block diagram 200 may also include error decoder 224. Error decoder 224 may be any appropriate electronic component and/or combination of components operable to decode a plurality of inputs in order to provide a plurality of detected error outputs. For example, error decoder 224 may be operable to receive the outputs of XOR gate 218 and OR gate 222. By decoding these signals, error decoder 224 may provide an output corresponding to a plurality of error present for a plurality of parity bits (e.g., "ecc_derr" and "ecc_serr"). These parity outputs may then be output to a user of the ECC module for further testing.

In some embodiments, example block diagram 200 may also include syndrome decoder 226. In some embodiments, syndrome detector 226 may be any appropriate combination and/or combination of components operable to decode one or more parity error outputs. For example, syndrome detector 226 may be operable to decode an output of XOR gate 220 into a one-hot identification of the parity bit of interest to a data set.

In some embodiments, example block diagram 200 may also include bit match 228. Bit match 228 may be any appropriate electronic component and/or combination of components operable to match an incoming bit number to a calculation vector order. In some embodiments, bit match 228 may receive an output from calculation vector bit order 202 as well as syndrome detector 226. After matching the bits output from these two modules, bit match 226 may output the matched bits to bitwise XOR array 230. Bitwise XOR array 230 may be any appropriate electronic component and/or combination of components operable to perform a bitwise logical XOR on a plurality of inputs. In the illustrative example, bitwise XOR array 230 may be operable to perform an XOR operation on the matched bit numbers and calculation vector bit order such that bitwise XOR array 230 may output a data set that may include a fault injection (e.g., "data_out[127:0]").

Such a configuration may allow functional safety customers a self-test of critical fault checking features in a manner that allows a system with up to two simultaneous hardware faults to be detected. Further, such a configuration may allow generation of the same software interrupt/trap that would occur on a true ECC fault. Although certain logic modules and configurations have been illustrated to aid in disclosure, more, fewer, and/or different configurations may be available without departing from the scope of the present disclosure.

Figure 3:
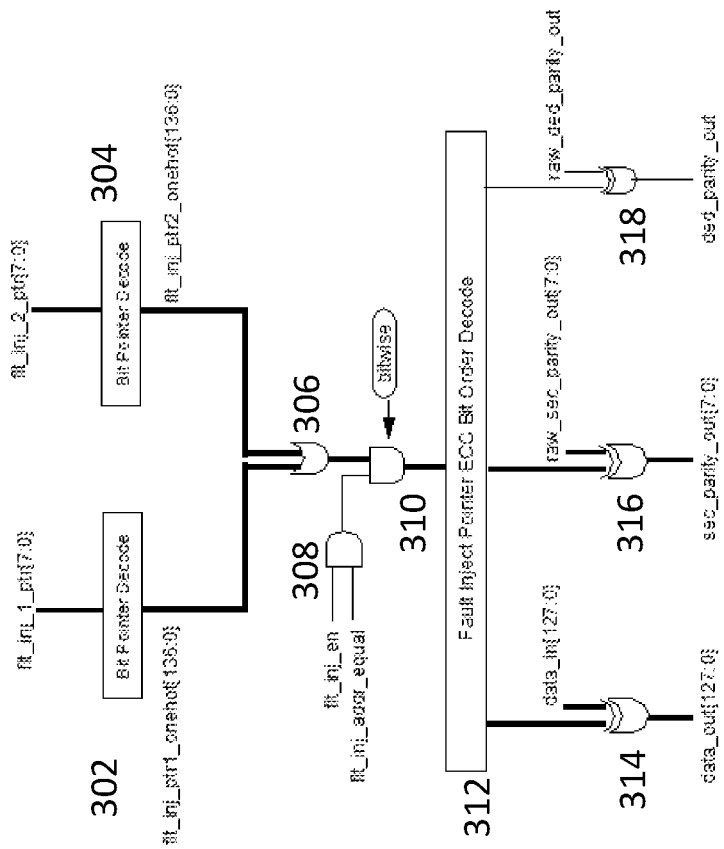
FIG. 3 illustrates an example ECC write path fault injection logic block diagram for injecting a single- or double-bit fault into a write path of an ECC module for hardware validation, in accordance with certain embodiments of the present disclosure.

FIG. 3 illustrates an example ECC write path fault injection logic block diagram 300 for injecting a single- or double-bit fault into a write path of an ECC module for hardware validation, in accordance with certain embodiments of the present disclosure. In some embodiments, example logic block diagram 300 may include a plurality of bit pointer decoders 302, 304, OR gate 306, AND gates 308, 330, bit order decoder 312, and XOR gates 314, 316, 318.

In some embodiments, example logic block diagram 300 may include a plurality of bit pointer decoders 302, 304. In the illustrative example of FIG. 3, two bit pointer decoders 302, 304 are illustrated, although more, fewer, and/or different decoders may be used without departing from the scope of the present disclosure. In some embodiments, decoders 302, 304 may be any appropriate electronic components, including logic components, software modules including program instructions stored on nonvolatile memory and executable by a processor, etc. operable to decode a bit pointer string. For example, decoders 302, 304 may decode an eight-bit pointer string into a one-hot signal in order to select a specific bin in up to 316-bits of data. Other decoder configurations may be included in any given configuration without departing from the scope of the present disclosure.

In some embodiments, each decoder 302, 304 may be operable to receive a fault injection pointer string. For example, decoder 302 may be operable to receive a first fault injection pointer string (e.g., "flt_inj_1_ptr[7:0]") and decoder 304 may be operable to receive a second fault injection pointer string (e.g., "flt_inj_2_ptr[7:0]"). Further, each decoder 302, 304 may be operable to communicate a decoded pointer string (e.g., a one-hot signal selecting a specific bin in a data set; for example, a 316-bit data set). For example, decoder 302 may be operable to communicate a first decoded fault injection pointer string (e.g., "flt_inj_ptr1_onehot[136:0]") and decoder 304 may be operable to communicate a second decoded fault injection pointer string (e.g., "flt_inj_ptr2_onehot[136:0]").

In some embodiments, the plurality of decoded fault injection pointer strings may be communicated to OR gate 306. OR gate 306 may be any appropriate electronic component and/or collection of components operable to perform a logical OR operation on a plurality of incoming signals. In some embodiments, OR gate 306 may be operable to perform an OR operation on the plurality of decoded fault injection pointer strings.

In some embodiments, example logic block diagram 300 may also include AND gate 308. In some embodiments, AND gate 308 may be any appropriate electronic component and/or collection of components operable to perform a logical AND operation on a plurality of incoming signals. In the illustrative example, AND gate 308 is operable to perform an AND operation on two incoming signals: a fault injection enable signal (e.g., "flt_inj_en") and an address match indication signal (e.g., "flt_inj_addr_equal"). In some embodiments, the signals incident to AND gate 308 are associated with conditions that a user and/or programmer of an ECC module may wish to impose prior to injecting an error into the ECC system. For example, the ECC module may be set up to only inject an error when: (1) the user of the ECC module has actively enabled the fault injection (e.g., set the fault injection enable signal); and (2) the write address matches a user-specified memory location (e.g., the address match indication signal is logically appropriate to the match). This may ensure that fault injection only occurs at a point selected by a user, allowing the resulting error interrupt to be handled appropriately.

In some embodiments, example logic block diagram 300 may also include AND gate 310. In some embodiments, AND gate 310 may be any appropriate electronic component and/or collection of components operable to perform a bitwise logical AND operation on a plurality of incoming signals. In the illustrative example, AND gate 310 is operable to perform a bitwise AND operation on two incoming signals: the communicated output of AND gate 308 and the communicated output of OR gate 306. This bitwise output may then be communicated to decoder 312.

In some embodiments, decoder 312 may be any appropriate electronic components, including logic components, software modules including program instructions stored on nonvolatile memory and executable by a processor, etc. operable to decode the output of AND gate 310 in order to provide a fault injection pointer ECC bit order to a plurality of outputs.

In the illustrative example, decoder 312 provides outputs to three additional logical components, although more, fewer, and/or different components may be used without departing form the scope of the present disclosure. In the illustrated configuration, the output of decoder 312 is communicated to XOR gates 314, 316, 318.

In some embodiments, XOR gate 314 be any appropriate electronic component and/or collection of components operable to perform a logical XOR operation on a plurality of incoming signals. In the illustrative example, XOR gate 314 is operable to perform an XOR operation on two incoming signals: the communicated output of decoder 312 and a corresponding data bit (e.g., "data_in[127:0]"). The associated output (e.g., "data_out[127:0]") may then be communicated to an ECC module as described in more detail below with reference to FIG. 2. In some embodiments, the output of XOR gate 314 may be associated with a fault that has been injected into a data bit that is part of the data set to be test.

In some embodiments, XOR gate 316 be any appropriate electronic component and/or collection of components operable to perform a logical XOR operation on a plurality of incoming signals. In the illustrative example, XOR gate 316 is operable to perform an XOR operation on two incoming signals: the communicated output of decoder 312 and a corresponding parity bit (e.g., "raw_sec_parity_out[7:0]"). The associated output (e.g., "sec_parity_out[7:0]") may then be communicated to an ECC module as described in more detail below with reference to FIG. 2. In some embodiments, the output of XOR gate 316 may be associated with a fault that has been injected into a parity bit that is associated with the data set to be test.

In some embodiments, XOR gate 318 be any appropriate electronic component and/or collection of components operable to perform a logical XOR operation on a plurality of incoming signals. In the illustrative example, XOR gate 318 is operable to perform an XOR operation on two incoming signals: the communicated output of decoder 312 and a corresponding parity bit (e.g., "raw_ded_parity_out[7:0]"). The associated output (e.g., "ded_parity_out[7:0]") may then be communicated to an ECC module as described in more detail below with reference to FIG. 2. In some embodiments, the output of XOR gate 318 may be associated with a fault that has been injected into a parity bit that is associated with the data set to be test.

Although certain logic modules and configurations have been illustrated to aid in disclosure, more, fewer, and/or different configurations may be available without departing from the scope of the present disclosure.

Figure 4:
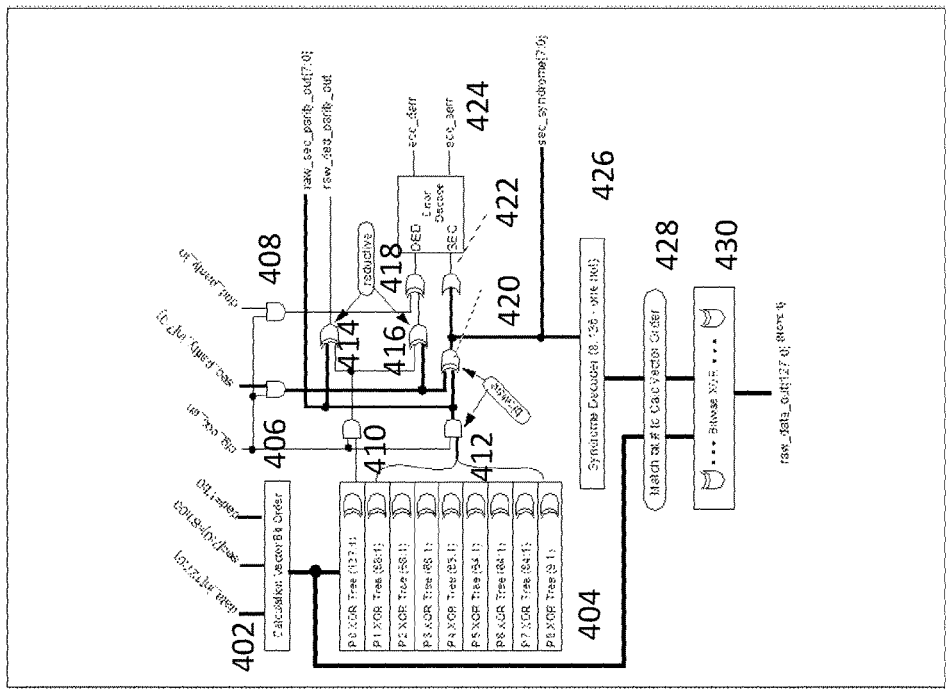
FIG. 4 illustrates an example ECC module block diagram for a run-time ECC error injection scheme for a read path, in accordance with certain embodiments of the present disclosure.

FIG. 4 illustrates an example ECC module block diagram 200 for a run-time ECC error injection scheme for a read path, in accordance with certain embodiments of the present disclosure. In some embodiments, example block diagram 200 may include calculation vector bit order 402, XOR tree 404, AND gates 406, 408, 410, 412, XOR gates 414, 416, 418, 420, OR gate 422, error decoder 424, syndrome decoder 426, bit match 428, and bitwise XOR array 430.

In some embodiments, calculation vector bit order 402 may be any appropriate electronic component and/or collection of components operable to order the calculation vector bits incoming to the ECC module. For example, calculation vector bit order 402 may receive one or more inputs from the example logic block diagram 100. These inputs may include, for example, the fault injection data output (e.g., data_in[127:0]). Calculation vector bit order 402 may also receive a plurality of other inputs, including for example a plurality of parity bit inputs (e.g., sec[7:0], ded). The output of calculation vector bit order 402 may then be communication to XOR tree 404 and/or bit match 428.

In some embodiments, XOR tree 404 may include a plurality of XOR trees, each associated with a portion of the data set. In the illustrative example, XOR tree 404 includes nine sub-trees. Each sub-tree may include a plurality of XOR gates, which may be any appropriate electronic component and/or collection of components operable to perform a logical XOR operation on a plurality of incoming signals. The inputs to XOR tree 404 may include the output of calculation vector bit order 402.

In some embodiments, example block diagram 200 may also include AND gate 406. AND gate 406 may be any appropriate electronic component and/or collection of components operable to perform a logical AND operation on a plurality of incoming signals. In the illustrative example, AND gate 406 performs a logical AND operation on one of the outputs of example logic block diagram 100 (e.g., sec_parity_in[7:0]) as well as an ECC enable signal (e.g., "cfg_ecc_en"). This may allow for the introduction of a parity fault signal into the ECC logic when appropriately enabled.

In some embodiments, example block diagram 200 may also include AND gate 408. AND gate 408 may be any appropriate electronic component and/or collection of components operable to perform a logical AND operation on a plurality of incoming signals. In the illustrative example, AND gate 408 performs a logical AND operation on one of the outputs of example logic block diagram 100 (e.g., ded_parity_in) as well as an ECC enable signal (e.g., "cfg_ecc_en"). This may allow for the introduction of a parity fault signal into the ECC logic when appropriately enabled.

In some embodiments, example block diagram 200 may also include AND gate 410. AND gate 410 may be any appropriate electronic component and/or collection of components operable to perform a logical AND operation on a plurality of incoming signals. In the illustrative example, AND gate 410 performs a logical AND operation on one of the outputs of XOR tree 404 as well as an ECC enable signal (e.g., "cfg_ecc_en"). This may allow for the introduction of a data fault signal into the ECC logic when appropriately enabled.

In some embodiments, example block diagram 200 may also include AND gate 412. AND gate 412 may be any appropriate electronic component and/or collection of components operable to perform a bitwise logical AND operation on a plurality of incoming signals. In the illustrative example, AND gate 412 performs a bitwise logical AND operation on a plurality of the outputs of XOR tree 404 as well as an ECC enable signal (e.g., "cfg_ecc_en"). This may allow for the bitwise introduction of a data fault into the ECC logic when appropriately enabled.

In some embodiments, example block diagram 200 may also include XOR gate 414. XOR gate 414 may be any appropriate electronic component and/or collection of components operable to perform a logical XOR operation on a plurality of incoming signals. In the illustrative example, XOR gate 414 performs a logical XOR operation on one of the outputs of AND gate 412 as well as an output of AND gate 410. This may allow for the output of a parity signal into the ECC logic. XOR gate 414 may provide a reductive function to the incoming signals.

In some embodiments, example block diagram 200 may also include XOR gate 416. XOR gate 416 may be any appropriate electronic component and/or collection of components operable to perform a logical XOR operation on a plurality of incoming signals. In the illustrative example, XOR gate 416 performs a logical XOR operation on one of the outputs of AND gate 406 as well as an output of AND gate 410. This may allow for the output of a parity signal into further ECC logic such as error decoder 424. XOR gate 414 may provide a reductive function to the incoming signals.

In some embodiments, example block diagram 200 may also include XOR gate 418. XOR gate 418 may be any appropriate electronic component and/or collection of components operable to perform a logical XOR operation on a plurality of incoming signals. In the illustrative example, XOR gate 418 performs a logical XOR operation on one of the outputs of AND gate 408 as well as an output of XOR gate 416. This may allow for the output of a parity signal into the ECC logic such as error decoder 424.

In some embodiments, example block diagram 200 may also include XOR gate 420. XOR gate 420 may be any appropriate electronic component and/or collection of components operable to perform a bitwise logical XOR operation on a plurality of incoming signals. In the illustrative example, XOR gate 420 performs a bitwise logical XOR operation on one of the outputs of AND gate 406 as well as an output of AND gate 412. This may allow for the output of a parity signal into the ECC logic such as error decoder 424.

In some embodiments, example block diagram 200 may also include OR gate 422. OR gate 422 may be any appropriate electronic component and/or collection of components operable to perform a logical OR operation on a plurality of incoming signals. In the illustrative example, OR gate 422 performs a logical OR operation on one of the bitwise outputs of XOR gate 420. This may allow for the output of a parity signal into the ECC logic such as error decoder 424.

In some embodiments, example block diagram 200 may also include error decoder 424. Error decoder 424 may be any appropriate electronic component and/or combination of components operable to decode a plurality of inputs in order to provide a plurality of detected error outputs. For example, error decoder 424 may be operable to receive the outputs of XOR gate 418 and OR gate 422. By decoding these signals, error decoder 424 may provide an output corresponding to a plurality of error present for a plurality of parity bits (e.g., "ecc_derr" and "ecc_serr"). These parity outputs may then be output to a user of the ECC module for further testing.

In some embodiments, example block diagram 200 may also include syndrome decoder 426. In some embodiments, syndrome detector 426 may be any appropriate combination and/or combination of components operable to decode one or more parity error outputs. For example, syndrome detector 426 may be operable to decode an output of XOR gate 420 into a one-hot identification of the parity bit of interest to a data set.

In some embodiments, example block diagram 200 may also include bit match 428. Bit match 428 may be any appropriate electronic component and/or combination of components operable to match an incoming bit number to a calculation vector order. In some embodiments, bit match 428 may receive an output from calculation vector bit order 402 as well as syndrome detector 426. After matching the bits output from these two modules, bit match 426 may output the matched bits to bitwise XOR array 430. Bitwise XOR array 430 may be any appropriate electronic component and/or combination of components operable to perform a bitwise logical XOR on a plurality of inputs. In the illustrative example, bitwise XOR array 430 may be operable to perform an XOR operation on the matched bit numbers and calculation vector bit order such that bitwise XOR array 430 may output a data set that may include corrected version of the data (e.g., "raw_data_out[127:0]"). Such a signal may not be used when intentionally injecting a fault via write path fault injection.

Such a configuration may allow functional safety customers a self-test of critical fault checking features in a manner that allows a system with up to two simultaneous hardware faults to be detected. Further, such a configuration may allow generation of the same software interrupt/trap that would occur on a true ECC fault. Although certain logic modules and configurations have been illustrated to aid in disclosure, more, fewer, and/or different configurations may be available without departing from the scope of the present disclosure.

FIG. 5 illustrates an example register summary 500 of an ECC fault injection system, in accordance with certain embodiments of the present disclosure. Example register summary 500 provides, for aid in understanding only, an example of how the relevant signals described in more detail above with reference to FIGS. 1-4 may be stored in a macro register. Such a configuration may allow a user of an ECC module to more readily access the ECC fault information in order to distinguish between an injection fault and an actual fault, in accordance with certain embodiments of the present disclosure.

According to various embodiments, the various embodiments have a number of features which make it more useful including: (1) the ability to inject either single or double bit errors, at any bit position in the data OR parity; (2) the ability to inject errors at a specific address; and (3) the ability to inject errors on either the read-side or the write-side of the data path, providing easier software implementations for many different user test algorithms.

What is claimed is:

1. An integrated peripheral device having a runtime self-test capabilities, comprising
a read path configured to internally forward read data;
a read fault injection logic configured to, under program control, inject at least one faulty bit into the forwarded read data; and
an error indication logic configured to, under program control, provide an error indication to a processor when a fault injection occurs;
wherein the read fault injection logic is further configured to inject the at least one faulty bit into the forwarded read data when a user has enabled the injection and when a read address matches a user-specified memory location.

2. The integrated peripheral device of claim 1, further comprising
   a write path configured to internally forward write data;
   a write fault injection logic configured to, under program control, inject at least one faulty bit into the forwarded write data; and
   an error indication logic configured to, under program control, provide an error indication to a processor when a location associated with the fault injection is accessed.

3. The integrated peripheral device of claim 1, wherein the peripheral device is an Error Correction Code module in a microcontroller.

4. The integrated peripheral device of claim 1, wherein the read path has a width of 136 bits.

5. The integrated peripheral device of claim 1, wherein the at least one faulty bit comprises a faulty parity bit.

6. The integrated peripheral device of claim 2, wherein the at least one faulty bit comprises a faulty parity bit.

7. The integrated peripheral device of claim 2, wherein the write fault injection logic is further configured to inject the at least one faulty bit into the forwarded write data when the user has enabled the injection and when the write address matches a user-specified memory location.

8. The integrated peripheral device of claim 1, further comprising error detection logic configured to, under program control, notify an ECC system that an error is present based at least on the at least one faulty bit in the forwarded read data.

9. The integrated peripheral device of claim 2, further comprising error detection logic configured to, under program control, notify an ECC system that an error is present based at least on the at least one faulty bit in the forwarded write data.

10. An integrated peripheral device having a runtime self-test capabilities, comprising
    a write path configured to internally forward write data;
    a write fault injection logic configured to, under program control, inject at least one faulty bit into the forwarded write data when a user has enabled the injection and when a write address matches a user-specified memory location.

11. The integrated peripheral device of claim 10, wherein the peripheral device is an Error Correction Code module in a microcontroller.

12. The integrated peripheral device of claim 10, wherein the read path has a width of 136 bits.

13. The integrated peripheral device of claim 10, wherein the at least one faulty bit comprises a faulty parity bit.

14. The integrated peripheral device of claim 10, further comprising error detection logic configured to, under program control, notify an ECC system that an error is present based at least on the at least one faulty bit in the forwarded write data.

15. A method for implementing a run-time ECC error injection scheme for hardware validation, the method comprising:
    configuring a read path to internally forward read data; and
    injecting at least one faulty bit into the forwarded read data via a read fault injection logic when a user has enabled the injection and when a read address matches a user-specified memory location.

16. The method of claim 15, further comprising
    configuring a write path to internally forward write data; and
    injecting at least one faulty bit into the forwarded write data via a write fault injection logic.

17. The method of claim 15, wherein the peripheral device is an Error Correction Code module in a microcontroller.

18. The method of claim 15, wherein the at least one faulty bit comprises a faulty parity bit.

* * * * *